(12) United States Patent
Boechler et al.

(10) Patent No.: US 9,512,894 B2
(45) Date of Patent: Dec. 6, 2016

(54) TUNABLE PASSIVE VIBRATION SUPPRESSOR

(71) Applicant: CALIFORNIA INSTITUTE OF TECHNOLOGY, Pasadena, CA (US)

(72) Inventors: Nicholas Boechler, Culpeper, VA (US); Robert Peter Dillon, Costa Mesa, CA (US); Chiara Daraio, Pasadena, CA (US); Gregory L. Davis, Pasadena, CA (US); Andrew A. Shapiro, Glendale, CA (US); John Paul C. Borgonia, Santa Fe Springs, CA (US); Daniel Louis Kahn, Altadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 168 days.

(21) Appl. No.: 13/851,730

(22) Filed: Mar. 27, 2013

(65) Prior Publication Data
US 2014/0097562 A1     Apr. 10, 2014

Related U.S. Application Data

(60) Provisional application No. 61/711,051, filed on Oct. 8, 2012.

(51) Int. Cl.
*F16F 9/30* (2006.01)
*F16F 7/01* (2006.01)
(Continued)

(52) U.S. Cl.
CPC .............. *F16F 7/015* (2013.01); *F16F 1/374* (2013.01); *F16F 9/303* (2013.01); *F16F 13/00* (2013.01);
(Continued)

(58) Field of Classification Search
CPC .......... F16F 1/36; F16F 1/3615; F16F 1/373; F16F 1/374; F16F 1/40; F16F 1/406; F16F 1/44; F16F 1/445; F16F 3/08; F16F 3/087; F16F 3/0873; F16F 3/0876; F16F 15/08; F16F 3/093; F16F 3/0935; F16F 7/015; F16F 7/08; F16F 7/087; F16F 7/082
USPC ............... 267/292, 293, 294, 152, 153, 141, 267/141.1; 244/173.1, 173.2; 188/268; 248/556, 557, 560, 566, 575
See application file for complete search history.

(56) References Cited

U.S. PATENT DOCUMENTS

| 123,999 | A | * | 2/1872 | King ............................. 267/294 |
| 1,703,222 | A | * | 2/1929 | Brimm, Jr. ................ 244/104 R |

(Continued)

FOREIGN PATENT DOCUMENTS

| FR | 1039317 | A | * | 7/1951 | .............. F16F 3/087 |
| GB | 243079 |   | * | 5/1925 | |

(Continued)

OTHER PUBLICATIONS

Machine translation of FR 1039317 (no date).*

(Continued)

*Primary Examiner* — Nicholas J Lane
(74) *Attorney, Agent, or Firm* — Steinfl & Bruno, LLP

(57) ABSTRACT

An apparatus and method for vibration suppression using a granular particle chain. The granular particle chain is statically compressed and the end particles of the chain are attached to a payload and vibration source. The properties of the granular particles along with the amount of static compression are chosen to provide desired filtering of vibrations.

14 Claims, 16 Drawing Sheets

(51) Int. Cl.
*F16F 13/00* (2006.01)
*F16F 1/374* (2006.01)
*F16F 1/36* (2006.01)
*F16F 1/44* (2006.01)
*F16F 3/087* (2006.01)

(52) U.S. Cl.
CPC .............. *F16F 1/3615* (2013.01); *F16F 1/445* (2013.01); *F16F 3/0876* (2013.01); *F16F 2234/08* (2013.01); *Y10T 29/49* (2015.01)

(56) References Cited

U.S. PATENT DOCUMENTS

| | | | | | |
|---|---|---|---|---|---|
| 2,239,113 | A | * | 4/1941 | O'Connor | 267/201 |
| 3,056,596 | A | * | 10/1962 | Moisson, Jr. | 267/141 |
| 3,424,448 | A | * | 1/1969 | Ma | 267/35 |
| 3,614,084 | A | * | 10/1971 | Brown | 267/153 |
| 3,923,292 | A | * | 12/1975 | Madden, Jr. | 188/377 |
| 4,010,940 | A | * | 3/1977 | Freyler | 267/201 |
| 4,011,929 | A | * | 3/1977 | Jeram et al. | 188/268 |
| 4,232,755 | A | * | 11/1980 | Dow | 180/65.6 |
| 4,475,722 | A | * | 10/1984 | Paton et al. | 267/202 |
| 5,465,986 | A | * | 11/1995 | MacRae | 280/33.994 |
| 2002/0011387 | A1 | | 1/2002 | Chu | 188/284 |
| 2003/0098389 | A1* | | 5/2003 | Dussac et al. | 244/17.27 |
| 2009/0229910 | A1* | | 9/2009 | Daraio | 181/142 |
| 2010/0032876 | A1* | | 2/2010 | Hiley et al. | 267/140.5 |
| 2011/0209940 | A1* | | 9/2011 | Daraio | 181/139 |

FOREIGN PATENT DOCUMENTS

| | | | | | |
|---|---|---|---|---|---|
| GB | | 1362221 | A | * | 7/1974 |
| GB | | 2079400 | A | * | 1/1982 | ................ F16F 1/44 |

OTHER PUBLICATIONS

Kittel, C. *Phonons I. Crystal Vibrations.* Introduction to Solid State Physics (Eighth Edition), Ch.4, pp. 89-104, Hoboken, NJ, John Wiley and Sons, 2005. ISBN 0-471-68057-5.
Johnson, K. L. *Normal contact of elastic solids: Hertz theory.* Contact Mechanics Cambridge, UK:, Cambridge University Press, 1985, pp. 84-104. ISBN 0- 521-255767.
Nesterenko, V. F. *Nonlinenar Impulses in Particulate Materials.* Dynamics of Heterogeneous Materials, Springer-Verlag, New York, 2001, pp. 1-126. ISBN 0-387-95266-7.
Porter, M.A., et al. *Highly nonlinear solitary waves in phononic crystal dimers.* Physical Review E, 77, 015601(R), 2008 & Physica D, 2009, p. 1-5.
Daraio, C., et al. *Tunability of solitary wave properties in one dimensional strongly nonlinear phononic crystals.* Physical Review E, 73, 026610 (2006), pp. 1-36.
Boechler, N. et al. *Discrete Breathers in One-Dimensional Diatomic Granular Crystals.* Mathematics and Statistics Department Faculty Publication Series. Paper 1131, 2010, pp. 1-5.
Herbold, E.B. et al. *Tunable frequency band-gap and pulse propagation in a strongly nonlinear diatomic chain* Acta Mechanica (in press), 2008.
de Billy, M. et al. *Experimental validation of band gaps and localization in a one dimensional diatomic phononic crystal.* Journal of Acoustical Society of America, vol. 122 (5), 2007, pp. 2594-2600.
Boechler, N. et al. *Analytical and experimental analysis of bandgaps in nonlinear one dimensional periodic structures.* IUTAM, Symposium on Recent Advances of Acoustic Waves in Solids, May 25-28, 2009, pp. 209-219.
Boechler, N. et al. *An experimental investigation of acoustic band gaps and localization in granular elastic chains.* Proceedings of the 22nd Biennial Conference on Mechanical Vibration and Noise VIB-5: Dynamics of Band-Gap Materials and Structures, Aug. 30-Sep. 2, 2009, San Diego, CA, USA, pp. 271-276.
Daraio, C. et al. *Energy Trapping and Shock Disintegration in a Composite Granular Medium.* Physical Review Letters, 96, 058002, 2006, pp. 1-15.
Fraternali, F. et al. *Optimal design of composite granular protectors.* Mechanics of Advanced Materials and Structures, vol. 17, 2010, pp. 1-19.
Nashif, A. D. et al. *Vibration Damping*, Chichester, New York, John Wiley and Sons, 1985, pp. 82-84. ISBN 0-471-86772-1.
Piersol, A. *Recommendations for the Acquisition and Analysis of Pyroshock Data.* Soundand Vibration, 26 pp. 18-21, Apr. 1992.
Himelblau, H. et al. *Handbook for Dynamic Data Acquisition and Analysis—IES Recommended Practices 012.1*, IEST-RP-DTE012.1, Institute of Environmental Sciences and Technology, pp. 231-237, May 1994.
Oppenheim, A.V. et al. *Discrete-Time Signal Processing*, Prentice-Hall, 1989, pp. 730-742.
Stewart, D. *A Platform with Six Degrees of Freedom*, Proc. Inst. Mech. Eng, vol. 180, Pt. 1, No. 15, 1965, pp. 371-386.

* cited by examiner

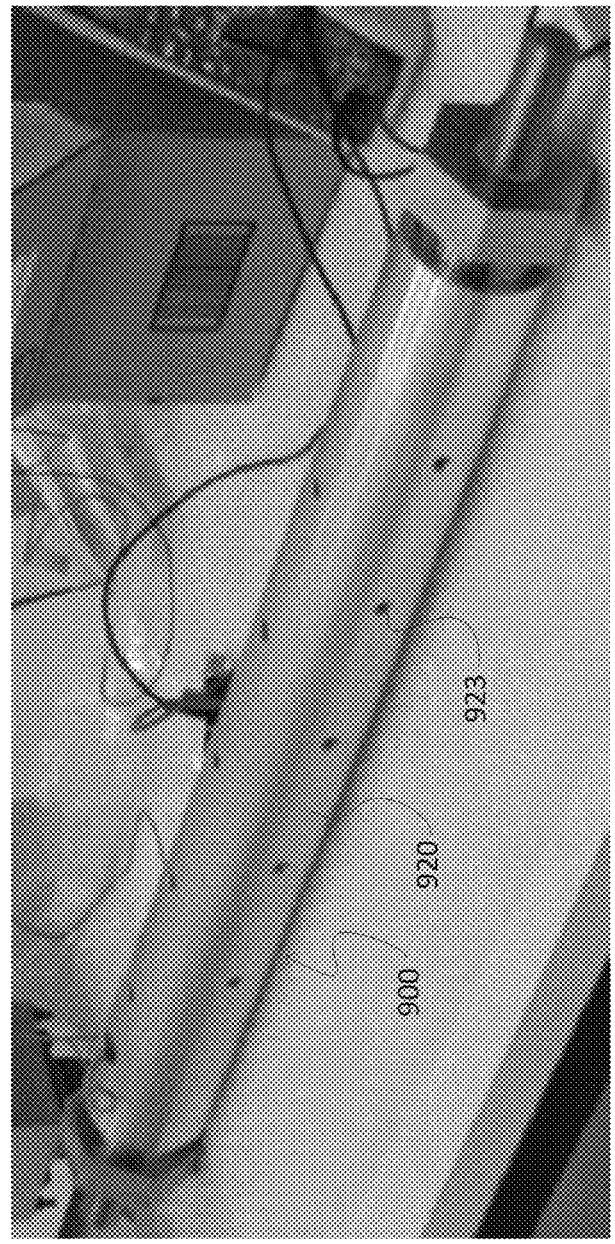

TUNABLE PASSIVE VIBRATION SUPPRESSOR

CROSS-REFERENCE TO RELATED APPLICATIONS

The present application is related to and claims the benefit of the following commonly assigned U.S. Patent Application: U.S. Patent Application No. 61/711,051, titled "A Granular Media Based Tunable Passive Vibration Suppressor with Self-Contained Mechanism for the Application of Static Compression," filed on Oct. 8, 2012, which is incorporated herein by reference in its entirety.

STATEMENT REGARDING FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

BACKGROUND

1. Field

This disclosure relates to shock and vibration suppression devices based on granular materials and mechanisms incorporating such devices. More particularly, the present disclosure relates to mechanisms and methods for vibration and shock suppression which combine conventional dissipative vibration protection mechanisms with a dispersive vibration filtering mechanism originating from the dynamics of a statically compressed granular medium.

2. Description of Related Art

Problematic and potentially damaging or dangerous impacts, shocks, and vibrations can be encountered in a variety of real life scenarios and engineering endeavors. Multiple devices and methods are known in the art for mitigating these undesired vibrations, where the devices and methods incorporate viscoelasticity, microscopic and macroscopic thermal energy dissipation, layered media composed of soft and hard materials, energy redirection, and active control. Specific devices include sand bags, automotive shock absorbers, rubber and plastic cell phone casings, and body armor. Such devices and methods have been highly successful to a point and are well understood.

For many aerospace applications, vibrations at low frequencies (acoustic and below) can be particularly problematic. Dispersive media known in the art, based on linear contact laws, when operated at such low frequencies, tend to have extremely large mass and system size or be too soft and have little load bearing capacity. Therefore, there exists a need in the art for vibration suppression systems and methods that will provide for operation at low frequencies and overcome the limitations of systems and methods currently known in the art.

SUMMARY

Described herein is the design of a tunable shock and vibration suppression device composed of statically compressed chains of spherical particles. The vibration suppression device superimposes a combination of dissipative damping and dispersive effects. The dissipative damping results from the elastic wave attenuation properties of the bulk material selected for the spherical particles, is independent of particle geometry and periodicity, and can be accordingly designed based on the dissipative (or viscoelastic) properties of the material. In one example, polyurethane, a type of viscoelastic elastomer is used. Viscoelastic elastomers often exhibit broadband dissipative damping. See, for example, Nashif, A. D., Jones, D. I. G., Henderson, J. P., "*Vibration Damping*", Chichester, N.Y., John Wiley and Sons, 1985, pp. 82-84. In contrast, the dispersive effects result from the periodic arrangement and geometry of the particles composing the chain. A uniform (monoatomic) chain of statically compressed, spherical particles will have a low pass filter effect, with a cutoff frequency tunable as a function of particle mass, elastic modulus, Poisson's ratio, radius, and static compression. Elastic waves with frequency content above this cutoff frequency will exhibit an exponential decay in amplitude as a function of propagation distance Applications for the disclosed invention include use with spacecraft in multiple operational scenarios such as launch vibrations, pyroshock events, or continuous vibrations from mechanical systems. However, the devices and methods associated with the invention are easily transferable to other areas where shocks or vibrations are of concern, by appropriately selecting material type, radii, and static compression. With the initial spacecraft application in mind, a system design was developed using a combination of theoretical, computational, and experimental techniques to appropriately select the particle radii, material (and thus elastic modulus and Poisson's ratio), and static compression, to satisfy estimated requirements derived for spacecraft vibration protection needs under potential operational conditions. Accordingly, a chain of polyurethane spheres which exhibit broadband dissipative damping in conjunction with a 1 kHz cutoff low pass dispersive filtering effect was selected.

This disclosure also presents the design of a novel self-contained method for adjustably applying (and simply adjusting or tuning) static compression to the chain of spheres while still transmitting vibration through the dissipative and dispersive media. The dispersive filtering effect described herein exists as predicted in the presence of static compression. However, the mechanical method for applying this compression should be decoupled from the vibration source and payload, such that vibrations are not primarily transmitted through the static compression mechanism and around the dissipative and dispersive media. An example described herein utilizes the solution of a soft-spring loaded casing for the chain of spherical particles, designed so that the first mode of the casing spring mass system is within the pass band of the dispersive filter. Attachment points are coupled directly to the first and last particle of the granular chain, for simple attachment in between payload and vibration source. The soft coupling and low frequency first mode of the casing ensure the vibrations are transmitted primarily through the filtering media.

This disclosure describes a prototype for a single axis vibration suppressor that was constructed and then tested, both under high amplitude simulated pyroshock and low amplitude continuous broadband noise perturbations. The experimental results show high attenuation with frequency response characteristics in accordance with theoretical and numerical predictions. Tests performed at the Jet Propulsion Laboratory (JPL) Environmental Test Lab (ETL) and at Caltech GALCIT laboratories show over two orders of magnitude reduction in the shock response spectra at frequencies over 1 kHz and over two orders of magnitude reduction in the peak accelerations for high amplitude transient shock-like impacts. Observations also showed approximately 1 order of magnitude reduction in the shock response spectra at frequencies below 1 kHz, which is attributed to the dissipative effects of the bulk polyurethane material. These findings are confirmed in low amplitude continuous broadband noise experiments, by comparing the response of the polyurethane spheres used in the system with the response of a solid polyurethane rod.

The disclosure also presents further designs for the integration of the described single axis vibration suppressor into a 6 degree of freedom hexapod "Stewart" mounting configuration. See Stewart, D., "A Platform with Six Degrees of Freedom", Proc. Inst. Mech. Eng, 180, 1965 for additional description of the "Stewart" mounting configuration. By integrating each single axis vibration suppressor into a hexapod formation, a payload will be protected in all six degrees of freedom from vibration. Additionally, other multiple operational scenarios, particularly in the case of high loads, may employ the disclosed vibration suppressor devices in parallel. The parallel application of these devices, divides the amplitude of the incident vibrations while preserving the frequency content.

Described herein is a vibration suppressor for suppressing vibrations between a payload and a vibration source, where the vibration suppressor comprises: a holder containing a chain of granular particles, wherein the chain has a first chain particle located at a first end of the chain and a last chain particle located at another end of the chain; a first piston having a first piston proximal end and a first piston distal end, wherein the first piston proximal end contacts the first chain particle and wherein the first piston distal end is configured to couple to the payload; and a second piston having a second piston proximal end and a second piston distal end, wherein the second piston proximal end contacts the last chain particle and wherein the second piston distal end is configured to couple to the vibration source, where the first piston and second piston are configured to adjustably apply static compression to the chain of granular particles.

Further described herein is a method for vibration suppression for suppressing vibrations between a payload and a vibration source, where the method comprises: coupling the payload to a first end of a chain of granular particles, wherein the granular particles comprise spherical or near-spherical particles; coupling the vibration source to an opposite end of the chain of granular particles; applying static compression to the chain of granular particles; and, selecting particle radius and material type of the granular particles and the static compression based on a cutoff frequency for vibration suppression.

Further described herein is a vibration suppression system comprising: a supporting base; a payload attachment structure; a plurality of vibration suppressors coupling the supporting base to the payload attachment structure, where at least one of the vibration suppressors comprises a tunable vibration suppressor comprising: a holder containing a chain of granular particles, wherein the chain has a first chain particle located at a first end of the chain and a last chain particle located at another end of the chain; a first piston having a first piston proximal end and a first piston distal end, where the first piston proximal end contacts the first chain particle and where the first piston distal end is configured to couple to the payload attachment structure; and a second piston having a second piston proximal end and a second piston distal end, where the second piston proximal end contacts the last chain particle and where the second piston distal end is configured to couple to the supporting base, and where the first piston and second piston are configured to adjustably apply static compression to the chain of granular particles.

BRIEF DESCRIPTION OF THE SEVERAL VIEWS OF THE DRAWINGS

FIG. 5B is a graph of coherence between input and output force sensors with the polyurethane monomer chain used for the graph of 5A in between.

FIG. 12 is a photograph of a prototype vibration suppressor without additional test hardware and payload mass model.

DETAILED DESCRIPTION

Figure 1:
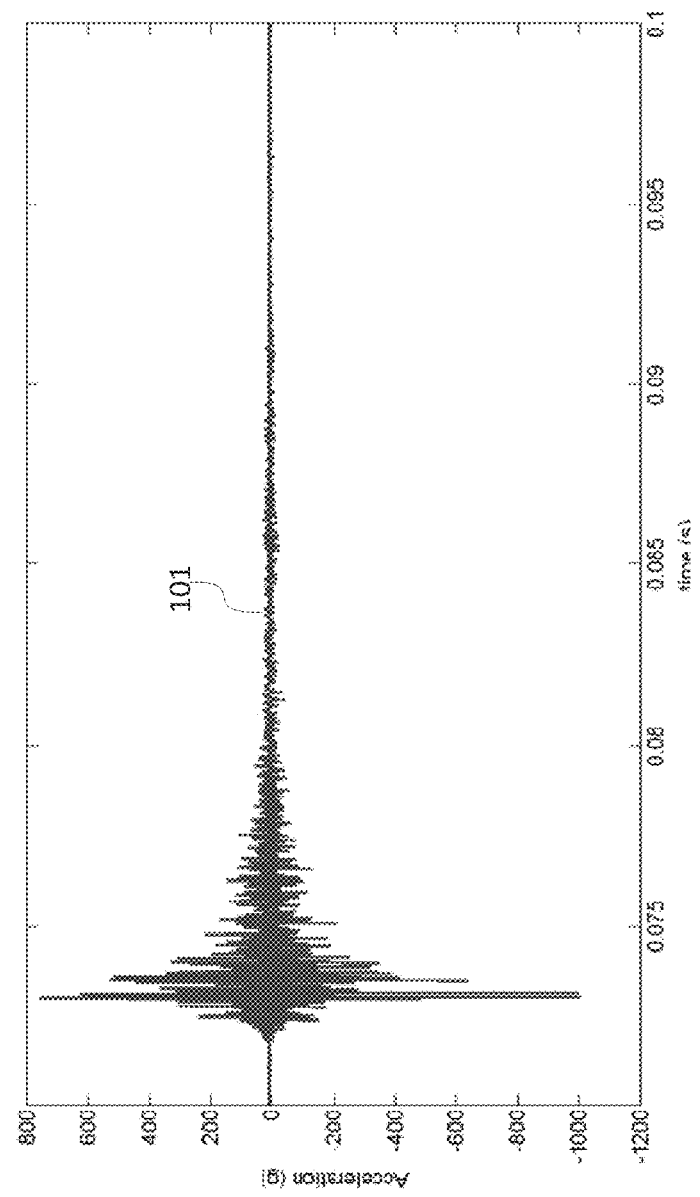
FIG. 1 is a graph of a simulated pyroshock input acceleration from the JPL ETL tunable beam.

Embodiments of the present invention have a novel dispersive vibration filtering mechanism originating from the dynamics of a statically compressed granular medium. The dispersive vibration filtering mechanism in a statically compressed granular medium is an analogous concept to quantized lattice vibrations, or phonons, from solid state physics. See, for example, Kittel, C., "*Introduction to Solid State Physics (Eighth Edition)*", Ch. 4, pp. 89-104, Hoboken, N J, John Wiley and Sons, 2005. In solid state physics, the atoms and interatomic potentials forming the crystal lattice can be thought of as a multi-degree of freedom mass-spring system. For these lattice systems, traveling waves with frequencies outside the supported quantized modes of vibrations, defined by the dispersion relation, are not supported, and cannot propagate through the lattice.

Macroscopic granular media, such as the chains of compressed spheres described herein, exist at the intersection of solid state physics and solid mechanics. These uniaxially compressed chains of spheres deform elastically, like the springs in the previous analogy, when in contact with each other with the nonlinear relationship defined by the Hertz contact law. See, for example, Johnson, K. L., "*Contact Mechanics*". Cambridge, UK, Cambridge University Press, 1985, pp. 84-104. Granular chains composed of elastic spheres have been shown to support various types of nonlinear waves and vibrations. See Nesterenko, V. F., "*Dynamics of Heterogeneous Materials*", Springer-Verlag, New York, 2001, pp. 1-126, and Porter, M. A.; Daraio, C.; Herbold, E. B.; Szelengowicz, I.; Kevrekidis, P. G. "Highly nonlinear solitary waves in phononic crystal dimers" Physical Review E, 77, 2009. With the addition of a linearizing static compression, this system has been shown to exhibit tunable band gaps and dispersion relations, similar to the lattices from solid state physics. Boechler, N.; Daraio, C. "An experimental investigation of acoustic band gaps and localization in granular elastic chains" Proceedings of the 22nd Biennial Conference on Mechanical Vibration and Noise VIB-5: Dynamics of Band-Gap Materials and Structures, Aug. 30-Sep. 2, 2009, San Diego, Calif., USA. Various other, related, applications have been suggested based on the reflection and disintegration of compact nonlinear pulses, such as shock absorbing layers, pulse trapping devices, and sound scramblers. See, for example, Daraio, C.; Nesterenko, V. F.; Herbold, E.; Jin, S. "Energy Trapping and Shock Disintegration in a Composite Granular Medium" Physical Review Letters, 96, 058002, 2006, and Fraternali, F.; Porter. M. A., Daraio, C.; "Optimal design of composite granular protectors" Mechanics of Advanced Materials and Structures, 17:1-19, 2010.

The concept of dispersive granular media is known in the art, but, generally, the gap between theory and its practical application has not been crossed. Disclosed herein are new methods for such practical application, particularly with respect to incorporation into aerospace systems.

Figure 2:
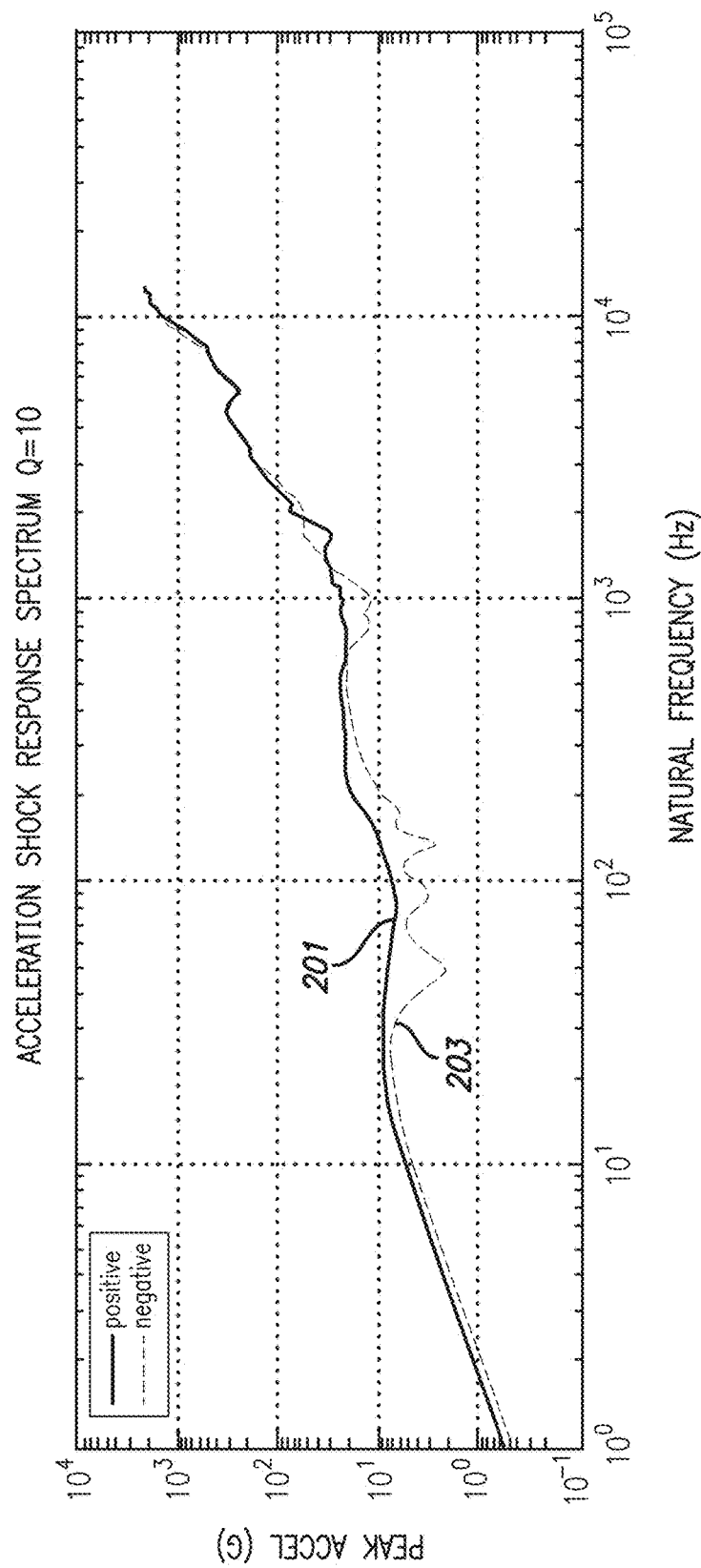
FIG. 2 is a graph of a sample shock response spectrum (SRS) from the JPL ETL tunable beam.

In aerospace applications there often exists a wide array of undesired shock and vibration sources. These include vibrations due to launch, pyroshock separations, control moment gyros, pumps, and attitude control thrusters. An example of a pyroshock event simulated by the tunable beam in JPL's ETL is shown in FIG. 1. Line 101 in FIG. 1 shows the simulated pyroshock input acceleration. This type of shock may be particularly damaging as it is high amplitude and has broadband frequency content. A common method of interpreting transient shock data is the shock response spectrum (SRS). The SRS is essentially how an infinite array of single degree of freedom systems responds to an arbitrary transient input. The SRS from data set illustrated in FIG. 1 is shown in FIG. 2. In FIG. 2, line 201 depicts the positive acceleration SRS and line 203 depicts the negative acceleration SRS. From this SRS, it can be seen that the peak acceleration increases significantly past 1 kHz and is therefore increasingly hazardous to a system or payload.

This type of typical input was initially used to frame the design requirements for a band gap based shock/vibration spacecraft protection system composed of granular media. More specifically, requirements were set such that the spacecraft protection system will show an order of magnitude reduction in the amplitude of the SRS, shown in FIG. 2, for frequencies above 1 kHz. The preloaded, multi-particle, periodic array being designed for shock/vibration filtering will be suitable for system and payload scale assemblies. This suitability for system and payload scale assemblies adds the additional requirement that the system be able to re-usably withstand the forces imposed by the systems it is coupled to under the estimated accelerations, and therefore operate under the yield stress of the material. The system must be of appropriate size (volume and mass) for incorporation into aerospace systems and have a practical method of attachment to payload and spacecraft.

To design the granular media, or chain of elastic spheres, to meet the requirements described above, the theory described below was used. The granular media was modeled as a chain of N nonlinear oscillators as shown in Eq. 1 below. In Eq. 1, $[Y]_+$ denotes the positive part of Y, $u_i$ is the displacement of the $i^{th}$ sphere (where $i=[1, \ldots, N]$) around the static equilibrium, $\delta_0$ represents the static displacement imposed by the added static compression, $m_i$ is the mass of the $i^{th}$ particle, and A and the exponent p are coefficients defined by a contact law. The exponent $p=1.5$ yields the Hertz potential law between adjacent spheres. Furthermore, for a uniform monomer chain and the Hertz contact law t coefficient A is defined by Eq. 2 where E represents the elastic modulus, R is the radius, and v is the Poisson's ratio (see also Johnson, K. L., "*Contact Mechanics*," Cambridge, UK, Cambridge University Press, 1985, pp. 84-104 or Nesterenko, V. F., "*Dynamics of Heterogeneous Materials*", Springer-Verlag, New York, 2001, pp. 1-126).

$$m_i\ddot{u}_i = A[\delta_0 + u_{i-1} - u_i]_+^p - A[\delta_0 + u_i - u_{i+1}]_+^p, \quad \text{Eq. 1}$$

$$A = \frac{\sqrt{2}\,E(R)^{\frac{1}{2}}}{3(1-\nu^2)} \quad \text{Eq. 2}$$

Under the addition of a linearizing static compression to a nonlinear system of oscillators, granular chains exhibit tunable acoustic frequency band gaps (see, for example, de Billy, M., Hladky-Hennion, A. C., "Experimental validation of band gaps and localization in a one dimensional diatomic phononic crystal" Journal of Acoustical Society of America, 122 (5), 2007). The nonlinear Hertzian contact force displacement relation between two spheres in a unit cell, and similarly the equations of motion shown and modeled in Eq. 1, can be linearized as shown in Eq. 3.

$$F_{i,j+1} \approx A\delta_0^{3/2} + 3/2 A\delta_0^{1/2}(u_i - u_{i+1}) \quad \text{Eq. 3}$$

This linearized approach and the introduction of a traveling wave solution results in the dispersion relation shown in Eq. 4 below and accordingly the upper cutoff frequency for the system shown in Eq. 5. $\omega$ represents the frequency, k is the wave number, a is the length of the unit cell (or 1 sphere diameter in a monoatomic case), and $\beta$ is the linearized stiffness as defined as in Eq. 6.

$$\omega^2 = \frac{\beta}{M}\left(2 \pm \sqrt{2(1+\cos(ka))}\right) \quad \text{Eq. 4}$$

$$\omega = 2\sqrt{\frac{\beta}{M}} \quad \text{Eq. 5}$$

$$\beta = \frac{3}{2} A^{2/3} F_0^{1/3} \quad \text{Eq. 6}$$

Figure 3:
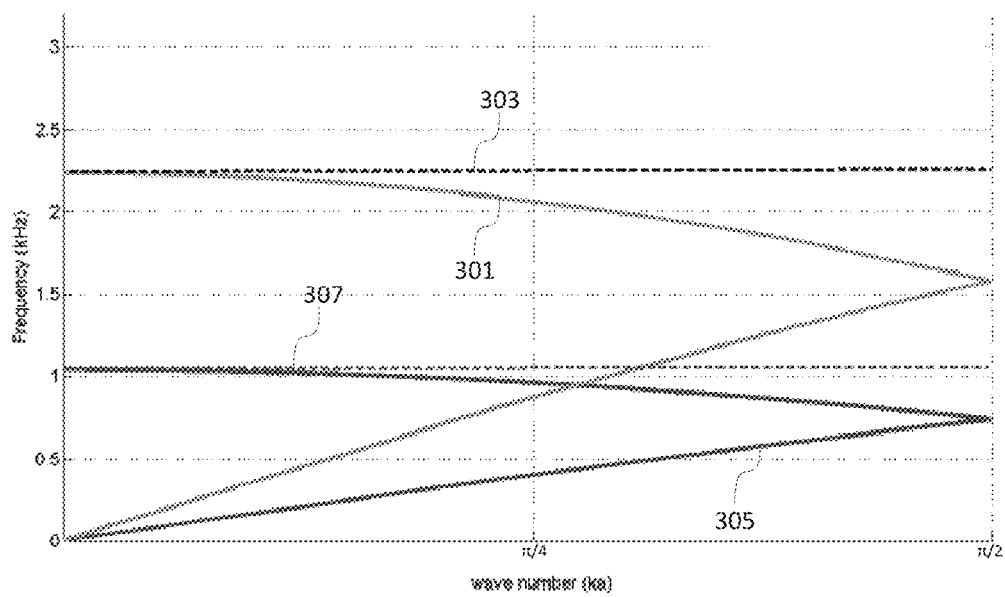
FIG. 3 is a graph of estimated dispersion relation and cutoff frequencies for a 0.0391 m diameter polyurethane sphere monoatomic granular chain under various static loadings.

An example of dispersion relations and upper cutoff frequencies for a 0.0391 m diameter polyurethane chain are shown in FIG. 3 for two values of static compression. In FIG. 3, line 301 depicts the dispersion relation for the chain under a static load of 1 kN and line 303 depicts the cutoff frequency at that static load of 1 kN. In FIG. 3, line 305 depicts the dispersion relation for the chain under a static load of 10 kN and line 307 depicts the cutoff frequency at that static load of 10 kN.

Figure 4A:
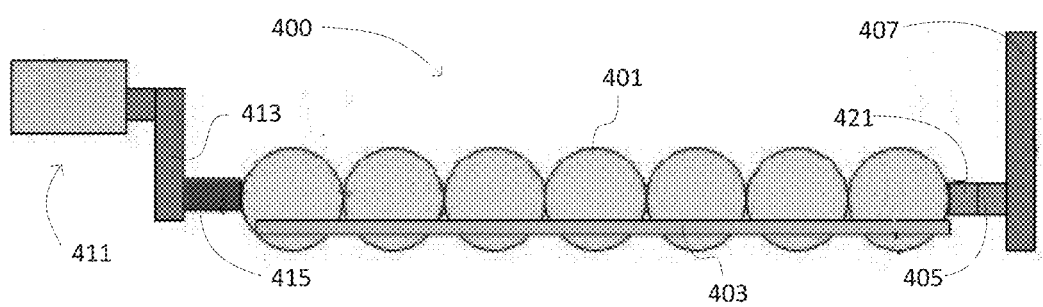
FIG. 4A shows an experimental setup for "dynamic" elastic modulus characterization using a piezoelectric actuator.
Figure 4B:
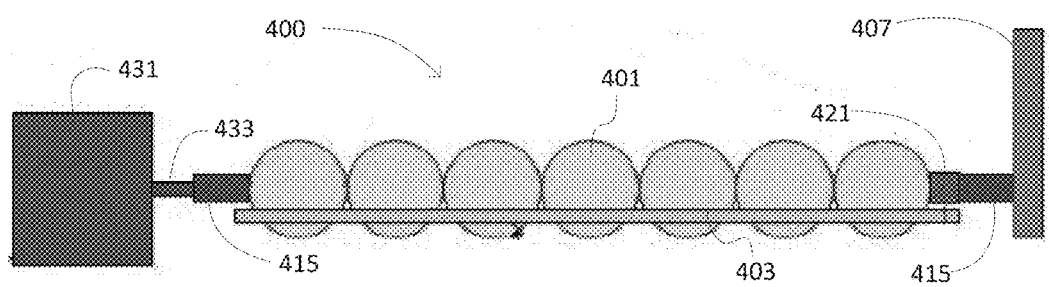
FIG. 4B shows an experimental setup for "dynamic" elastic modulus characterization using an electrodynamic shaker.

To obtain more accurate estimates of the expected cutoff frequency for use in the system design with various materials and sizes, "dynamic" elastic modulii were experimentally characterized as shown in Table 1. The "dynamic" elastic modulii were obtained by assembling two experimental setups to align and dynamically perturb a granular chain as shown in FIGS. 4A and 4B. Both setups consisted of a monoatomic granular chain 400, composed of various material spheres 401 (depending on the particular test) constrained to a 1 dimensional configuration by two Teflon coated steel bars 403 forming a track. The first setup configuration shown in FIG. 4A was used to test higher stiffness, lower dissipation materials, where lower displacements are required, and the second was used for softer more dissipative materials. In the first configuration, a piezoelectric actuator 405 was mounted on a steel bracket 407 at one end of the chain 400. At the other end, static compression was applied by a hanging mass lever system 411 with a static compression lever 413. The static load was estimated based on geometry and the applied mass, and also calibrated by a static load cell 421 which was then removed. The dynamic force was measured at by a dynamic force sensor 415 attached to the static compression lever 413 at the opposite end of the chain 400 from the applied excitations. In the second setup configuration shown in FIG. 4B, the steel bracket 407 served as a "wall" at one end of the chain 400. The other end of the chain 400 was excited dynamically by an electrodynamic shaker 431. Static compression was applied by an internal shaker spring within the electrodynamic shaker 431. The dynamic force at the "wall" end of the chain 400 was read by a dynamic force sensor 415 inserted between the wall and a static load cell 421. As shown in FIG. 4B, a dynamic force sensor 415 was also attached in between a shaker stinger 433 from the electrodynamic shaker 431 and the granular chain 300. The static compression was measured by the static load cell 421 placed in front of the dynamic force sensor 415 mounted on the "wall" 407.

TABLE 1

| Material | Adjusted "Dynamic" Elastic Modulus (GPa) |
| --- | --- |
| Steel | 210 |
| Polycarbonate | 2.93 |
| Polyurethane | 0.42 |
| PTFE | 1.89 |

Figure 5A:
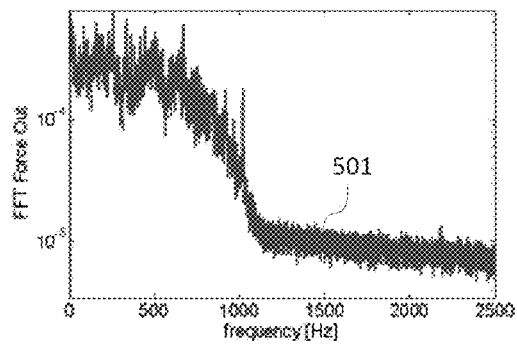
FIG. 5A is a graph of an FFT of transmitted force spectrum for a 7 particle, 0.0391 m diameter polyurethane sphere monoatomic granular chain with 10.8 N static compression and excited by an electrodynamic shaker.
Figure 5B:
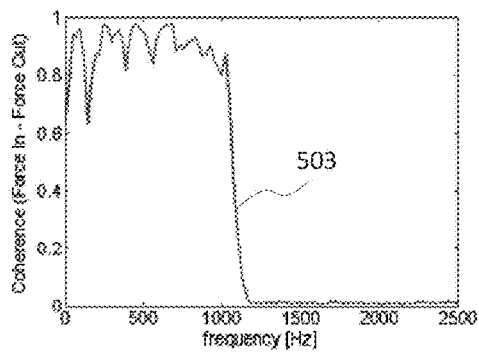
Figure 6:
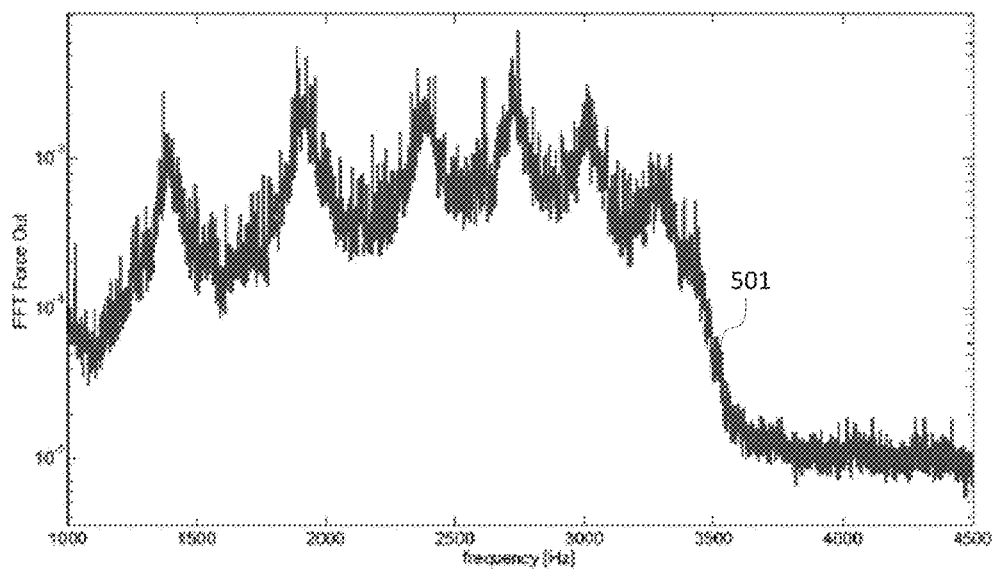
FIG. 6 is a graph of an FFT of transmitted force spectrum for a 0.0391 m diameter steel sphere monoatomic granular chain with 13.7 N static compression excited by a piezoelectric actuator.

In both cases, low amplitude broadband noise with frequency content throughout the frequency region of interest was applied. The dynamic force response was analyzed with a Fast Fourier Transform (FFT) and a discrete magnitude squared coherence estimate, and thus measured the spectrum. FIG. 5A shows the dynamic force output spectrum with line 501 and FIG. 5B shows dynamic force input-output sensor coherence with line 503 for a 7 particle, 0.0391 m diameter polyurethane chain, with a static compression of 10.8 N using the shaker configuration shown in FIG. 4B. FIG. 6 shows the dynamic force output spectrum for a 7 particle, 0.0391 m diameter, grade E52100 steel chain, with a static compression of 13.7 N using the piezoelectric actuator configuration shown in FIG. 4A. From these spectra, the cutoff frequency of the monoatomic granular chain was estimated. Using Eqs. 2, 5, and 6 above, a "dynamic" elastic modulus, essentially a fitting parameter, was also estimated for materials in this configuration under this type of excitation.

After obtaining the estimated material properties, a sensitivity analysis was performed to select the static compression, particle radius, and material type for the system, and polyurethane was selected.

With the selection of polyurethane, the particle radii and static compression were set to fit the design requirements of estimated load and desired cutoff frequency. The maximum load was estimated to be the load due to the static compression. The static compression load was set to be 10 times the expected force due to the rigid body acceleration of the estimated payload under the estimated imposed peak accelerations to keep the linearization of the nonlinear equations of motion valid. This translates into a peak stress in the polyurethane material which was estimated as the stress due to the addition of the aforementioned static compression. The peak stress in the material is calculated as per Johnson (see Johnson, K. L., "*Contact Mechanics*". Cambridge, UK, Cambridge University Press, 1985, pp. 84-104). This should be kept under the yield stress of the material for survivability and repeatability of the vibration suppressor. Accordingly, the yield stress of the material is the main driver of the static loading and the particle radii is the main driver of cutoff frequency.

As a result of preliminary analysis, 11 5 cm diameter spheres with static loading of 10 kN were selected. For the actual test prototype, this static loading was divided by 6 as the expected deployment is in a hexapod (e.g., 6 degree of freedom hexapod "Stewart" mounting configuration.

The design and construction of the static compression mechanism for the multiparticle stack provides for flexibility in the implementation of the vibration suppressor. The input and output ends of the granular chain should couple with the excitation source and the sensitive payload, respectively. The chain also should be free to move within its container and the container should be decoupled from the excitation source. Alternative aspects of vibration suppressors according to this disclosure may not implement all or any of these constraints, but the constraints discussed above provide for the best vibration suppression performance.

An exemplary container was machined from an aluminum cylinder to provide clearance for a stack of polyurethane spheres. Enough clearance was provided to accommodate the spheres' dilated diameter under precompression. Aluminum was selected for its strength and high rigidity to ensure the sphere alignment, and survival through shock testing. Those skilled in the art understand that other metals or other materials may be used to construct such a container. Sphere expansion was tested directly using an Instron MTS machine in compression to statically measure the applied force and the resulting displacement. This increase in diameter and a 50% margin was added to the manufacturing diameter tolerance of the spheres.

Figure 7:
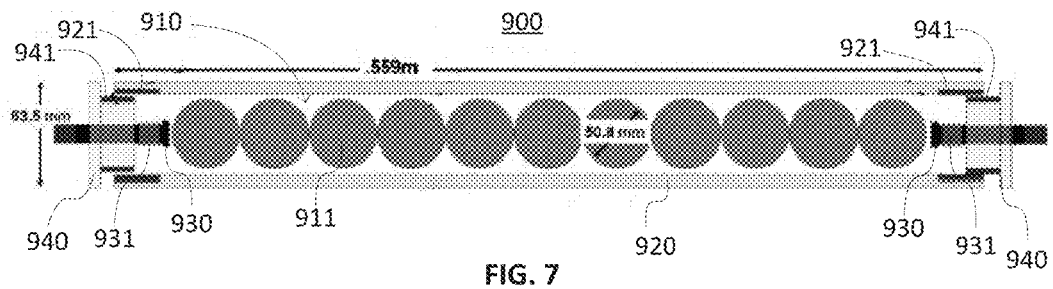
FIG. 7 illustrates a vibration suppressor.
Figure 8:
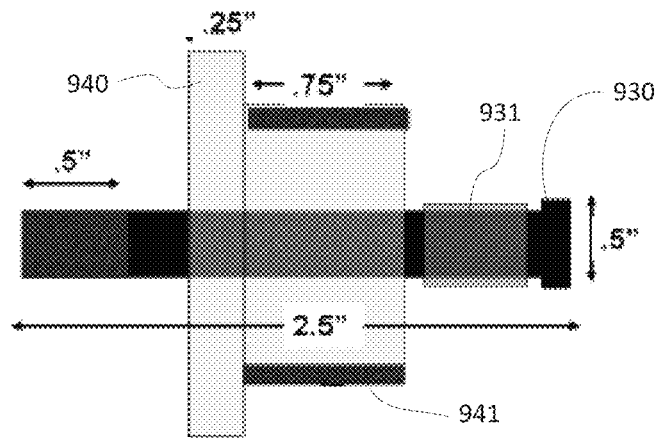
FIG. 8 illustrates an end cap for a vibration suppressor.
Figure 9:
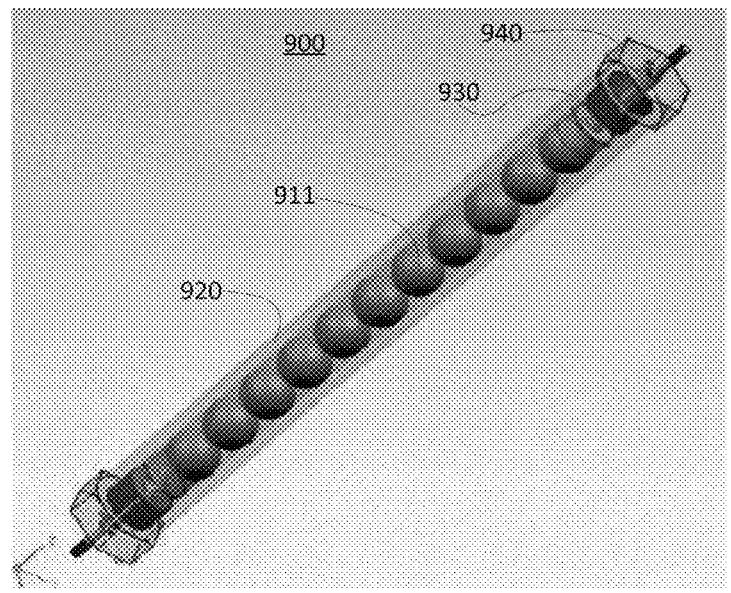
FIG. 9 shows a parasolid model of an assembled prototype vibration suppressor.

Schematic diagrams of the vibration suppressor concept are shown in FIG. 7, FIG. 8, and FIG. 9. FIG. 7 shows an exemplary vibration suppressor 900. Note that the dimensions for the vibration suppressor shown in FIG. 7 are for illustration purposes only. Other vibration suppressors may have other dimensions according to the disclosure presented herein. As shown in FIG. 7, a chain 910 of polyurethane spheres 911 is contained within a cylinder 920 having a length of 0.559 m and a diameter of 63.5 mm. The polyurethane spheres have a diameter of 50.8 mm. Pistons 930 at each end of the cylinder 920 make contact with the granular chain 910 of spheres 911. Static compression of the granular chain 910 is achieved through the use of soft springs 931 located between the pistons 930 and end caps 940 which screw onto the container 920. Compression of the springs 931 by tightening the end caps 940 allows the amount of static compression to be adjusted and maintained. Threaded portions 941 of the end caps 940 engage with threaded portions 921 of the cylinder 920 to allow the end caps 940 to be tightened. The threaded ends of the piston rods 930 extend through Teflon® linear bearings (not shown in FIG. 7) which are press-fit into the end caps 940. The static compression may be measured by a static load cell inserted into the ends of one of the pistons (not shown in FIG. 7). This combination of simple adjustability and measurement, allows for the possible addition of active control of the damper structure. If it were desirable to change the frequency region for which vibrations are transmitted, this could be done in situ via this method. FIG. 8 shows the end cap 940 in more detail. Note again that the dimensions shown in FIG. 8 are for exemplary purposes. In particular, FIG. 8 shows that the piston 930 may have an enlarged lip where the piston 930 contacts a sphere 911 in the chain 910. FIG. 9 shows a parasolid model of the vibration suppressor 900 depicted in FIG. 7.

Figure 10:
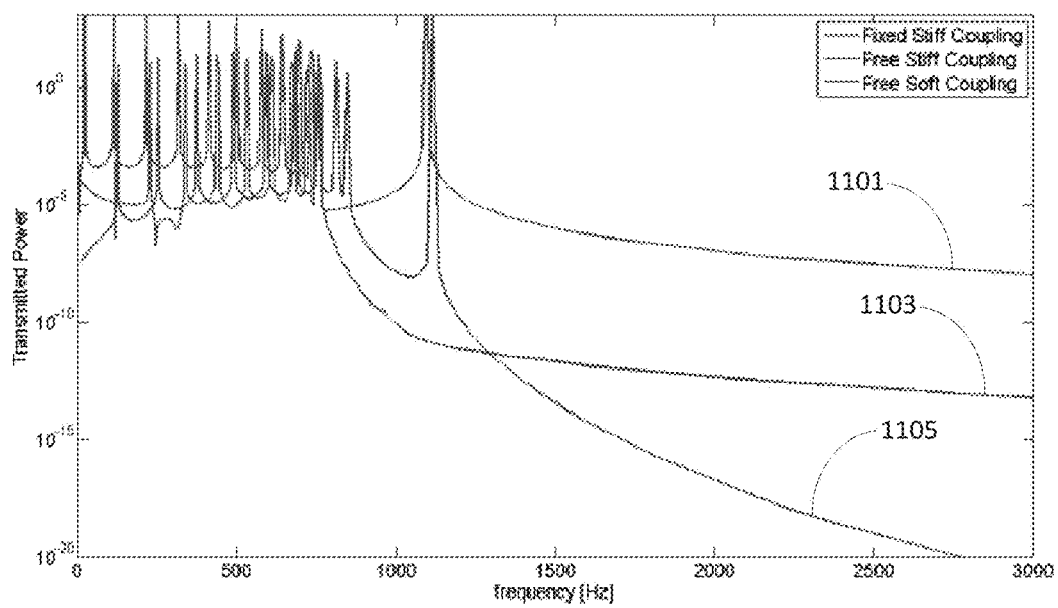
FIG. 10 is a graph of calculated Bode response for a linear spring mass system with fixed boundary conditions versus stiffly and softly coupled free casings with parameters similar to prototype experimental conditions described herein.
Figure 11A:
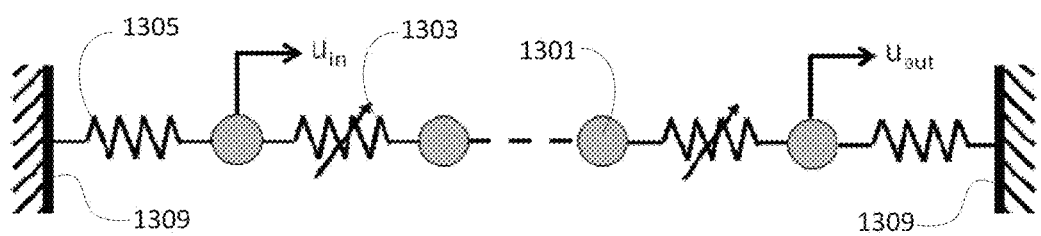
FIG. 11A is a diagram of a spring mass model for "fixed" boundary conditions.
Figure 11B:
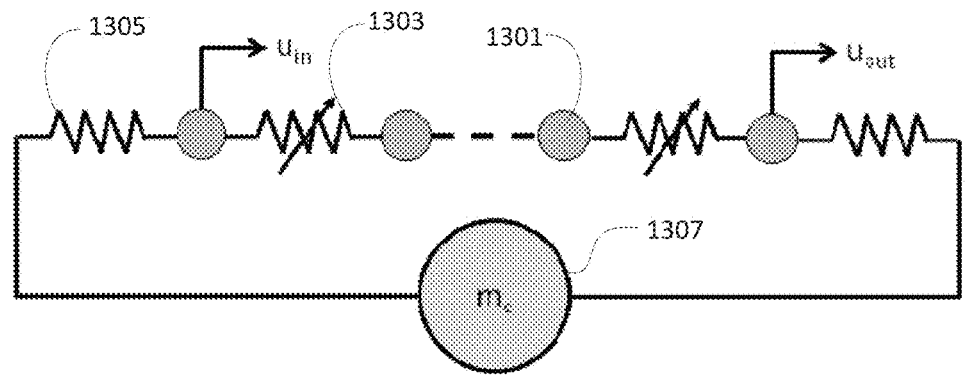
FIG. 11B is a diagram of a spring mass model for "quasi-free" boundary conditions with coupling to a large mass casing.

The selection of proper spring stiffness is important for the functionality of the vibration suppressor. FIG. 10 shows a state space formulation bode plot of the linearized spring mass system corresponding to the prototype described above, and a comparison between an 11 particle polyurethane chain with fixed boundary conditions connected by stiff springs, and a large mass casing connected to both polyurethane boundaries by either soft or stiff springs. In FIG. 10, line 1101 shows the calculated Bode response for free stiff coupling, line 1103 shows the response for free soft coupling, and line 1105 shows the response for fixed stiff coupling. FIG. 11A depicts the spring mass model for fixed boundary conditions. In FIG. 11A, the model consists of polyurethane spheres 1301, the elastic boundaries 1303 between the spheres, and the stiff springs 1305 coupled to fixed boundaries 1309. In FIG. 11B, the model shows the stiff springs 1305 coupled to a large mass casing 1307. It can be seen in the cases with a stiff spring coupling to the boundaries that an additional resonance appears past the predicted cutoff of the infinite polyurethane granular chain. In the case of the free casing with stiff springs this reduces the attenuation of the system, and implies the transmission of vibration directly through the casing. In the case with a soft spring coupling to a free casing, this mode is within the pass band of the polyurethane granular chain and maintains attenuation past the cutoff frequency. Springs for the prototype were selected accordingly.

Figure 13:
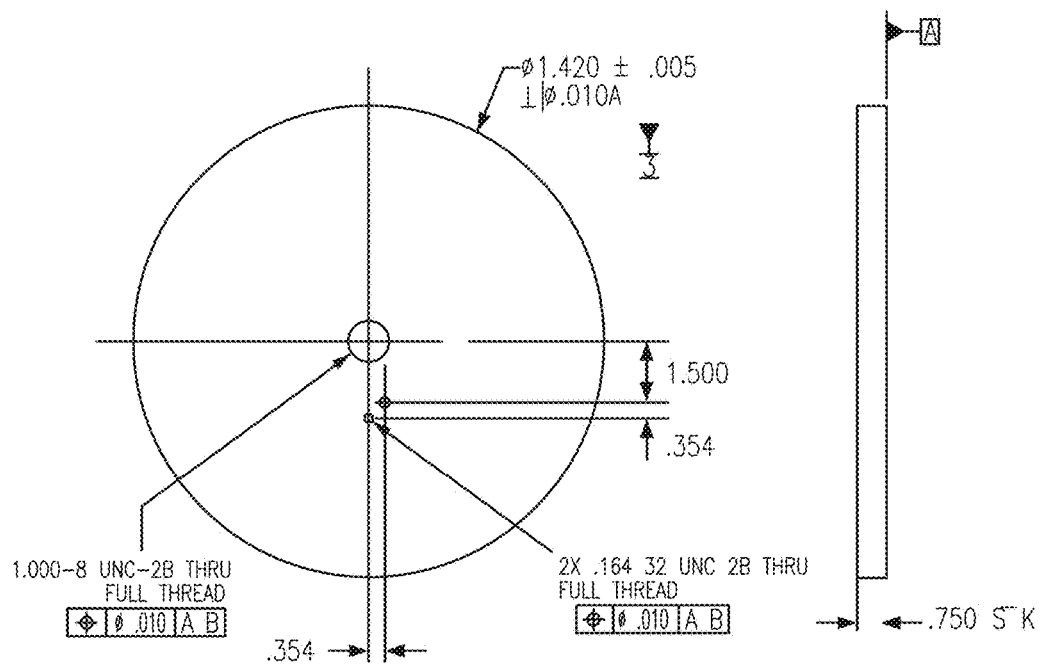
FIG. 13 is a diagram of a payload mass model (top plate).
Figure 14:
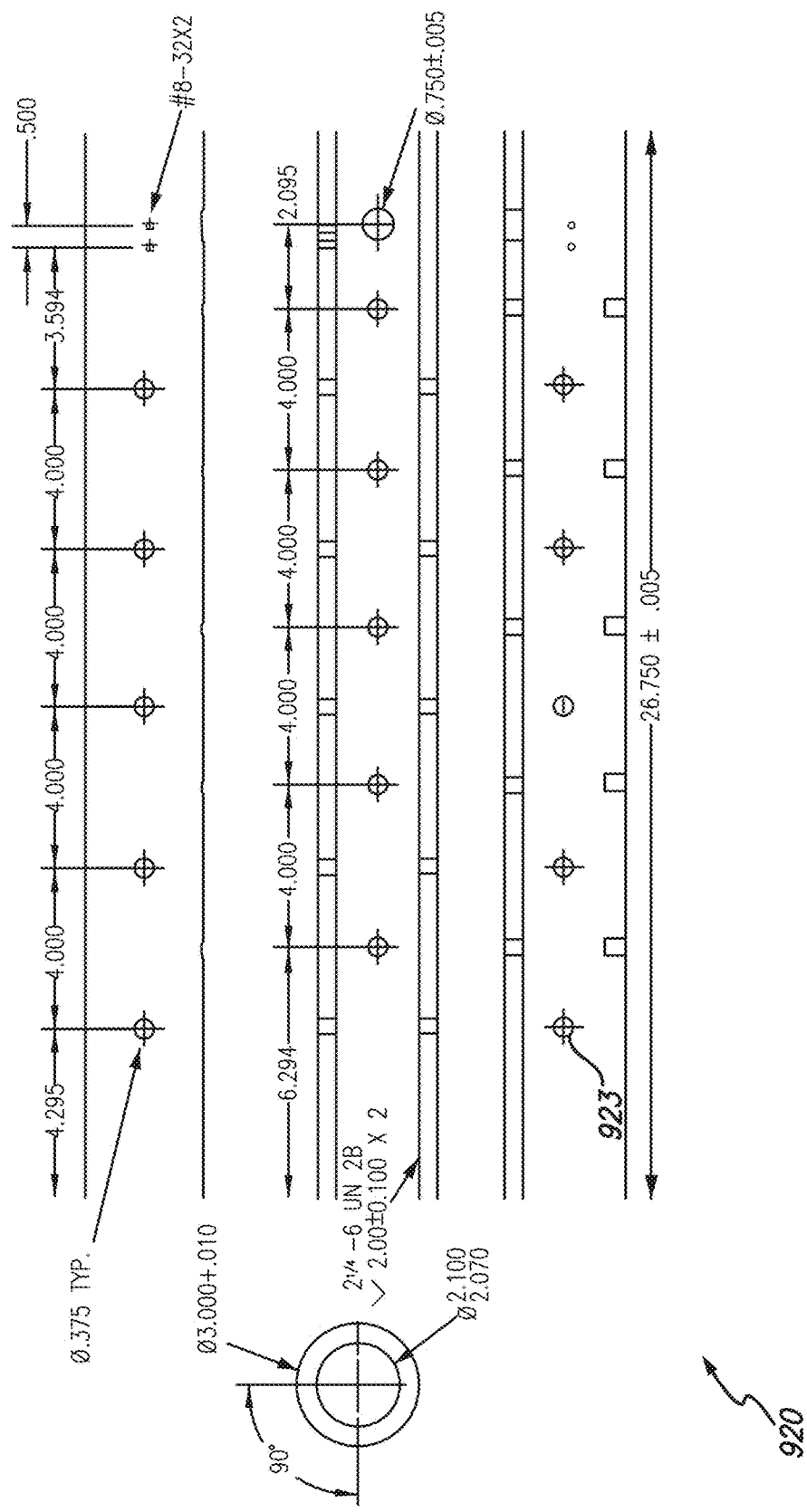
FIG. 14 shows various views of a granular chain containment tube.
Figure 15:
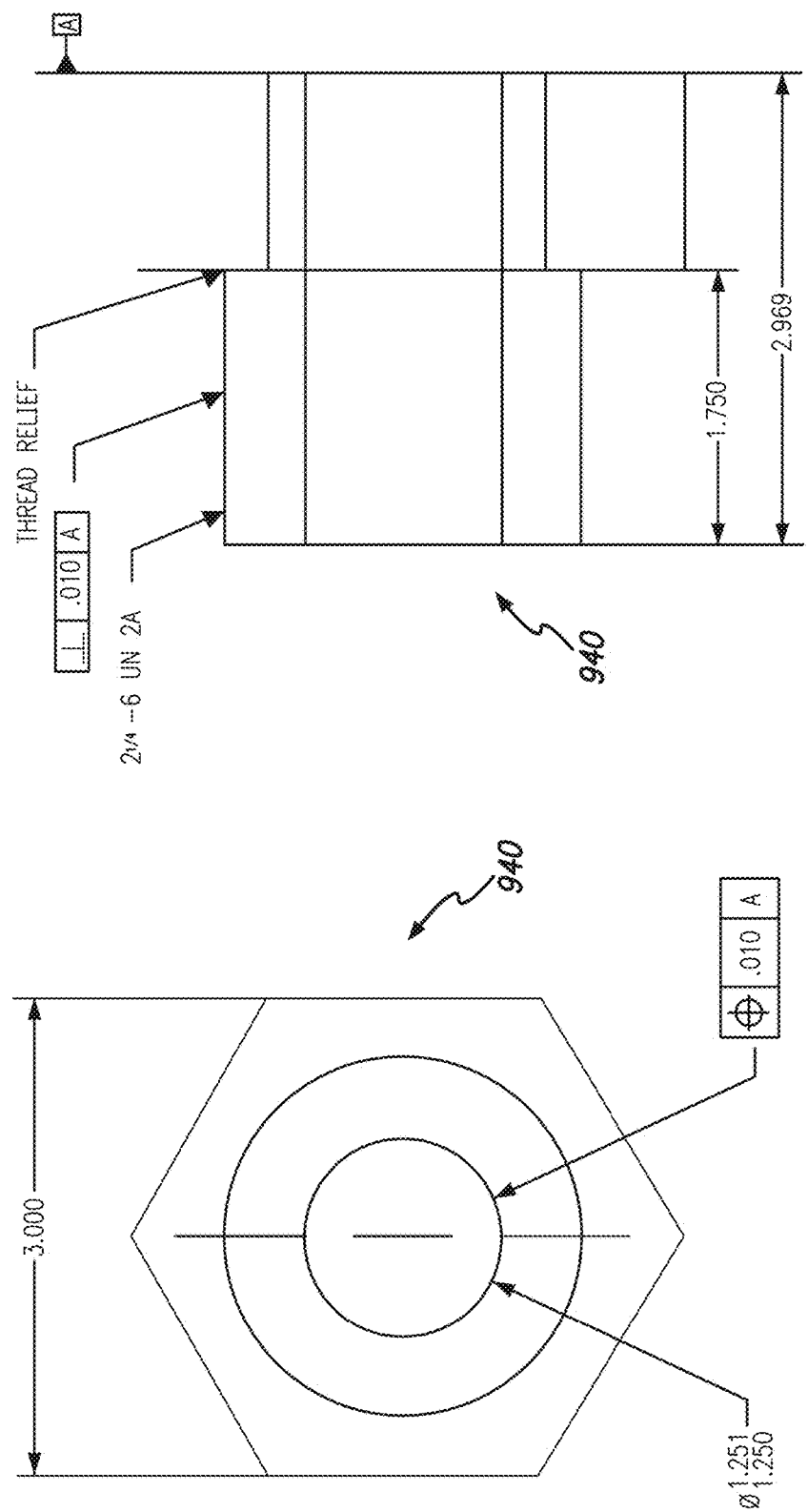
FIG. 15 shows various views of adjustable static compression end caps.
Figure 16:
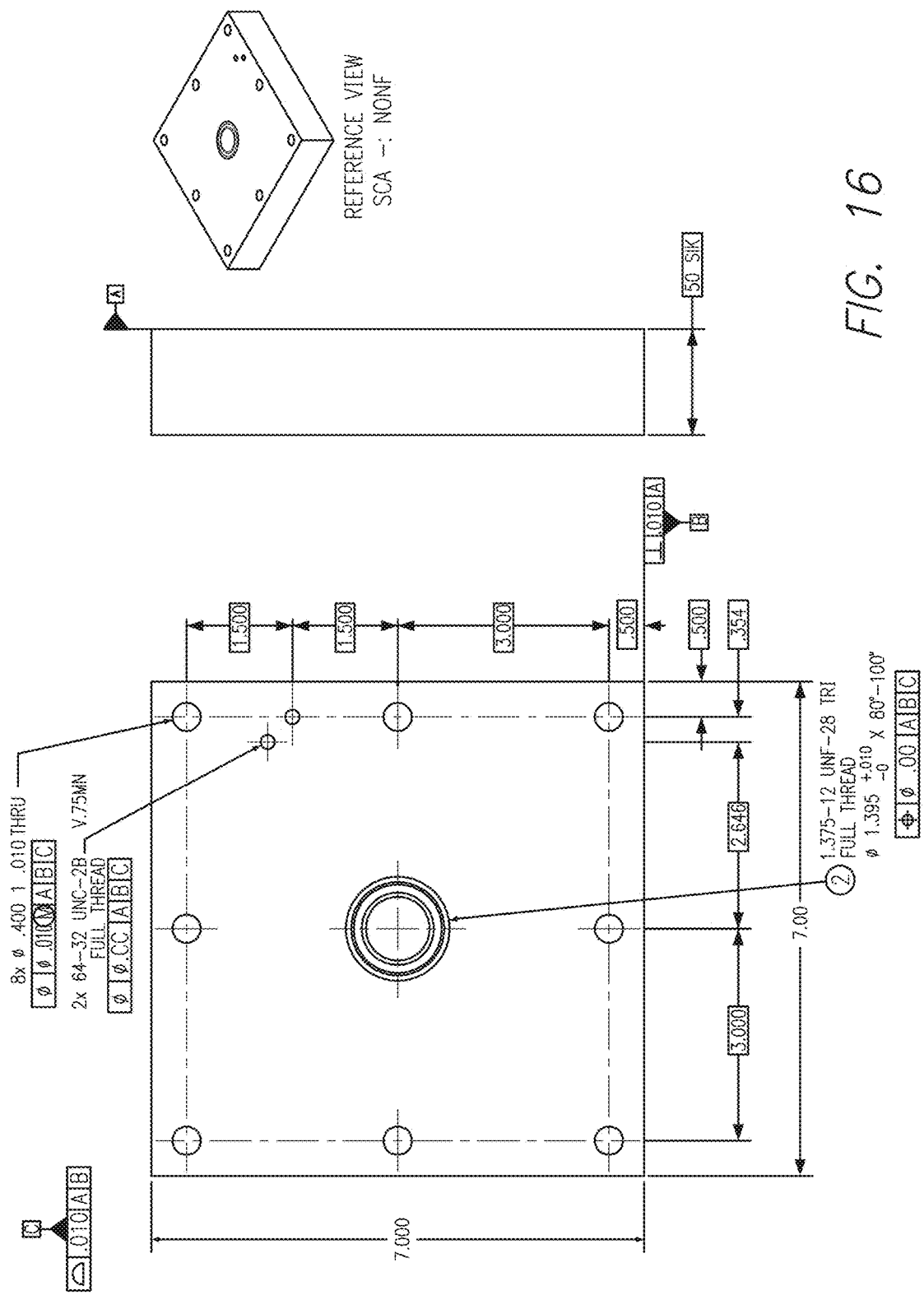
FIG. 16 shows various views of a JPL ETL test base plate.
Figure 17:
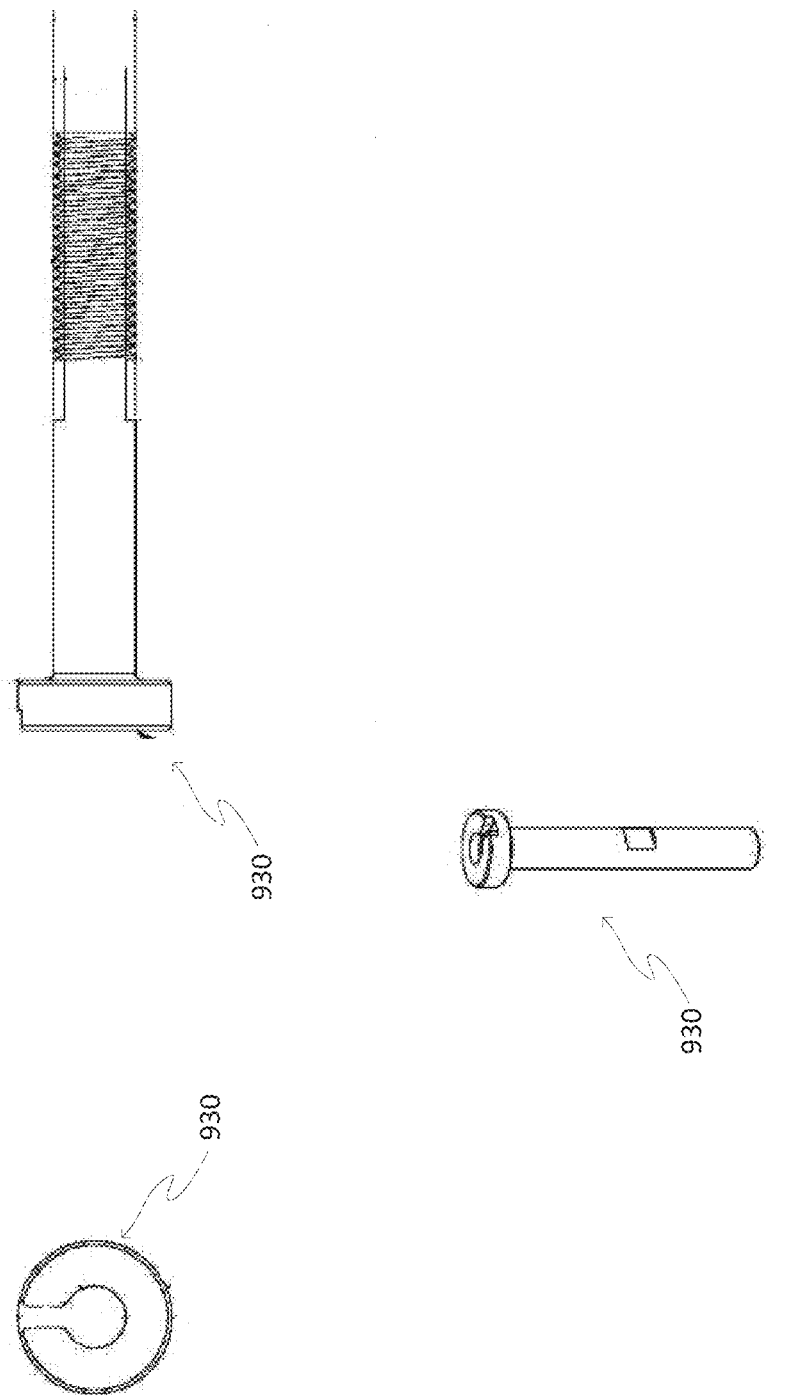
FIG. 17 shows various views of a vibration/payload monomer coupling piston.

A photograph of the hardware without any attached payload or test hardware is shown in FIG. 12. The cylinder 920 of the vibration suppressor 900 shown in FIG. 12 has vent holes 923, the purpose of which is explained below. FIG. 13 shows the mass model payload plate. FIG. 14 is a schematic drawing of the monomer containment tube 920 also fabricated from aluminum. Note the vent holes 923 in the container sidewall are positioned to align with the spherical particle contact interfaces. FIG. 15 is a schematic drawing of the adjustable static compression end caps 940. The end caps 940 were machined out of stainless steel to ensure survival of the threads during the application of static compression during testing. FIG. 16 is a drawing of the base plate for attachment of the prototype to the tunable beam in JPL's ETL. FIG. 17 is a schematic drawing of the vibration and payload monomer coupling piston 930, which was machined from stainless steel. As previously described, these pistons 930 fit through Teflon® linear bearings press-fit into the end caps 940 and are supported between the springs coupling to the end cap 940 and casing 920, and the nonlinear spring of the granular chain 910.

Figure 18:
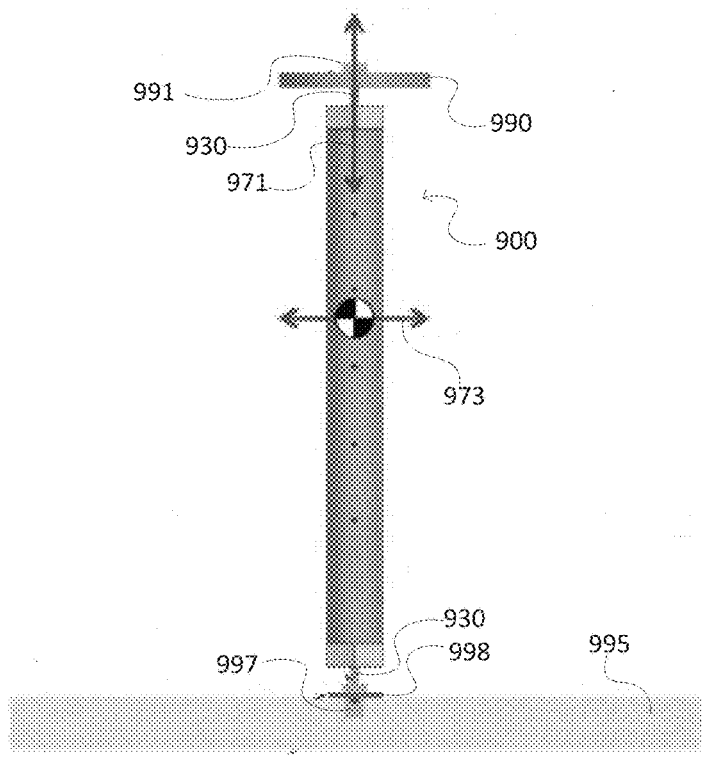
FIG. 18 shows the experimental tunable beam test setup at the JPL ETL.

FIG. 18 shows the experimental tunable beam test setup at the JPL ETL. In FIG. 18, the 1.67 kg mass model payload plate 990 is fastened to a piston 930 with a jam nut 991 at the top of the suppressor 900 while the bottom of the suppressor 900 is attached to a vibe plate 995. A heavy duty insert 997 in the vibe plate 995 is used to prevent the suppressor 900 from pulling out at loads less than 1300 g. A washer 998 is used at the vibe plate 995 to assist the heal-toe reaction at the insert 997. The piston 930 was fabricated with PH steel which allowed maximum bending load in the lateral direction of 3.5 g, while the thread configuration was chosen to allow maximum tensile compression load in the axial direction of 1300 g. In FIG. 18, line 971 depicts the axial load direction, while line 973 depicts the lateral load direction. A static load cell was embedded in one piston 930 to monitor the amount of static compression applied by tightening the end caps 940.

Figure 19:
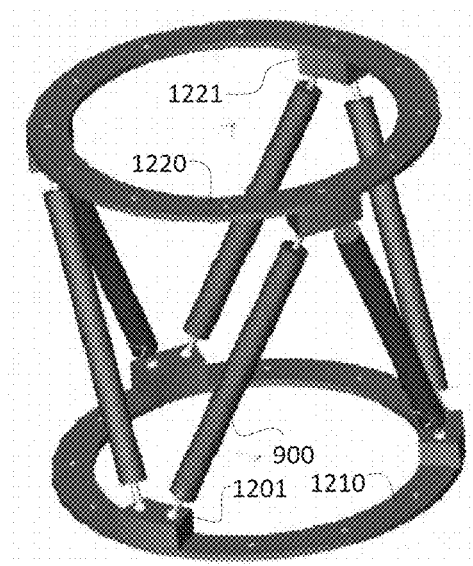
FIG. 19 shows multiple vibration suppressors in a hexapod deployment.

A suggested deployed configuration for the vibration damper is in a "Stewart" hexapod configuration. This concept is shown in FIG. 19, and would provide the combined benefits of reducing the peak loads and isolating the payload from vibrations in six degrees of freedom. In this figure, the vibration suppressors 900 are the 1D vibration damping struts connected by the silver ball joints 1211, 1221 to a payload ring 1220 and a spacecraft attachment ring 1210 on either side. The spacecraft attachment ring 1210 may also be considered as a supporting base, while the payload ring 1220 may be considered as a payload attachment structure. As shown in FIG. 19, the six vibration suppressors 900 are connected in pairs at the payload ring 1220 at each payload ball joint 1221 and as separate pairs at the spacecraft ring 1210 at each spacecraft ball joint 1211. In the configuration shown in FIG. 19, the vibration suppressors 900 within each pair are deployed in a non-parallel configuration. In that non-parallel configuration, the spacecraft attachment ring end of one vibration suppressor in each pair is attached proximate to the spacecraft attachment ring end of one vibration suppressor in each pair is attached to the spacecraft The assembled prototype was tested under two experimental and, similarly, applicational conditions. Simulated transient high amplitude pyroshock events were generated at the JPL ETL tunable beam and continuous vibration low amplitude broadband noise at Caltech GALCIT laboratories.

Figure 20:
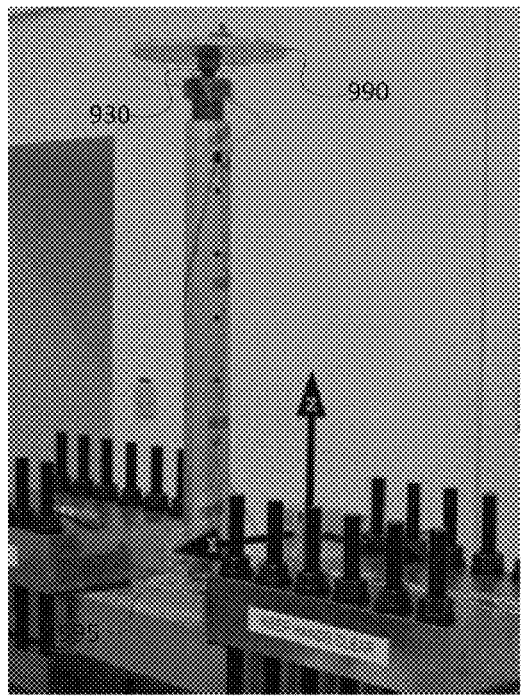
FIG. 20 is a photograph of a prototype vibration suppressor with a payload mass model installed for testing on the tunable beam at the JPL ETL.

As discussed above, FIG. 18 is a drawing of the tunable beam test setup and a photo of the assembled test setup is shown in FIG. 20. Two accelerometers (north and south) oriented in the axial direction (or Z as shown in FIG. 20) were mounted to the base plate 995 that affixing the prototype to the tunable beam, to monitor input accelerations to the prototype. A tri-axial accelerometer was mounted on the payload mass plate close to the attachment point between the piston 930 and the payload plate 990. An additional accelerometer was mounted farther out on the mass plate 990 oriented in the axial (or Z) direction. Shock was applied to the prototype by pneumatically accelerating an aluminum slug to impact a strike plate mounted to the bottom of the tunable beam. The beam is tunable and can provide customizable frequency content shock events to a test article. Monitoring the accelerations of the base plate and analyzing the response in terms of a SRS, the knee frequency of the beam was selected to be approximately 1 kHz. This translates to an approximately exponential increase in the SRS from 0-1 kHz and approximately uniform SRS response after 1 kHz.

Figure 21A:
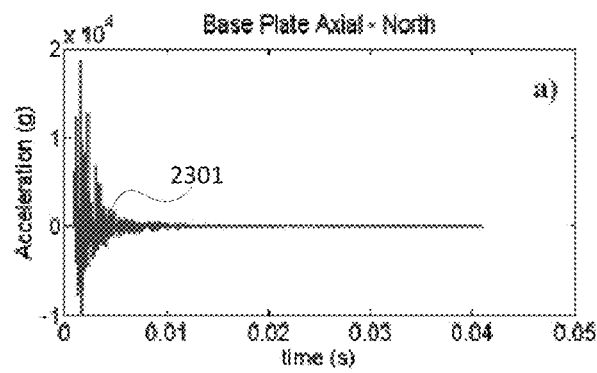
FIG. 21A is a graph of the input accelerations at the north side of the base plate measured during the JPL ETL tunable beam test.
Figure 21B:
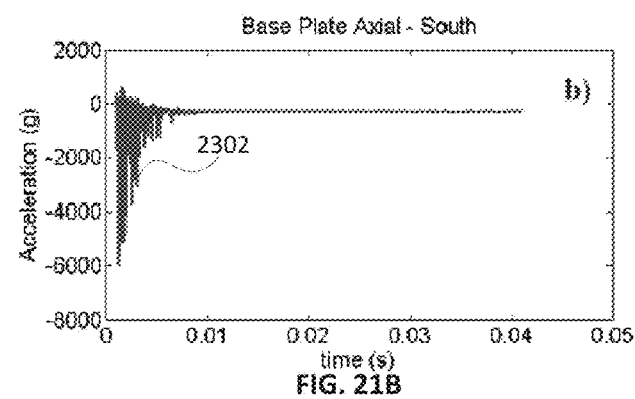
FIG. 21B is a graph of the input accelerations at the south side of the base plate measured during the JPL ETL tunable beam test.
Figure 21C:
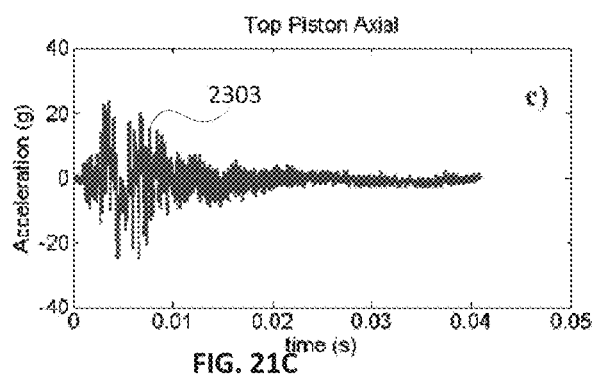
FIG. 21C is a graph of the output accelerations at a triaxial accelerometer mounted on top of the piston measured during the JPL ETL tunable beam test.
Figure 21D:
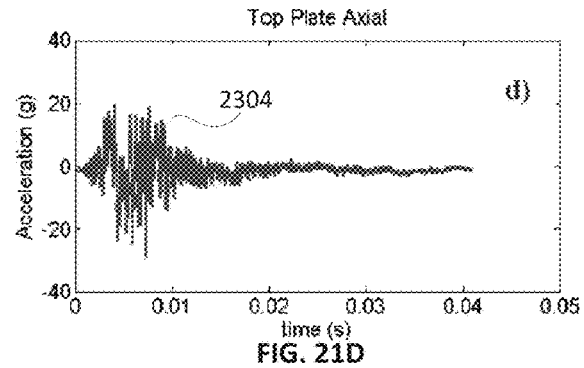
FIG. 21D is a graph of the output accelerations at an accelerometer mounted on the payload plate measured during the JPL ETL tunable beam test.
Figure 22:
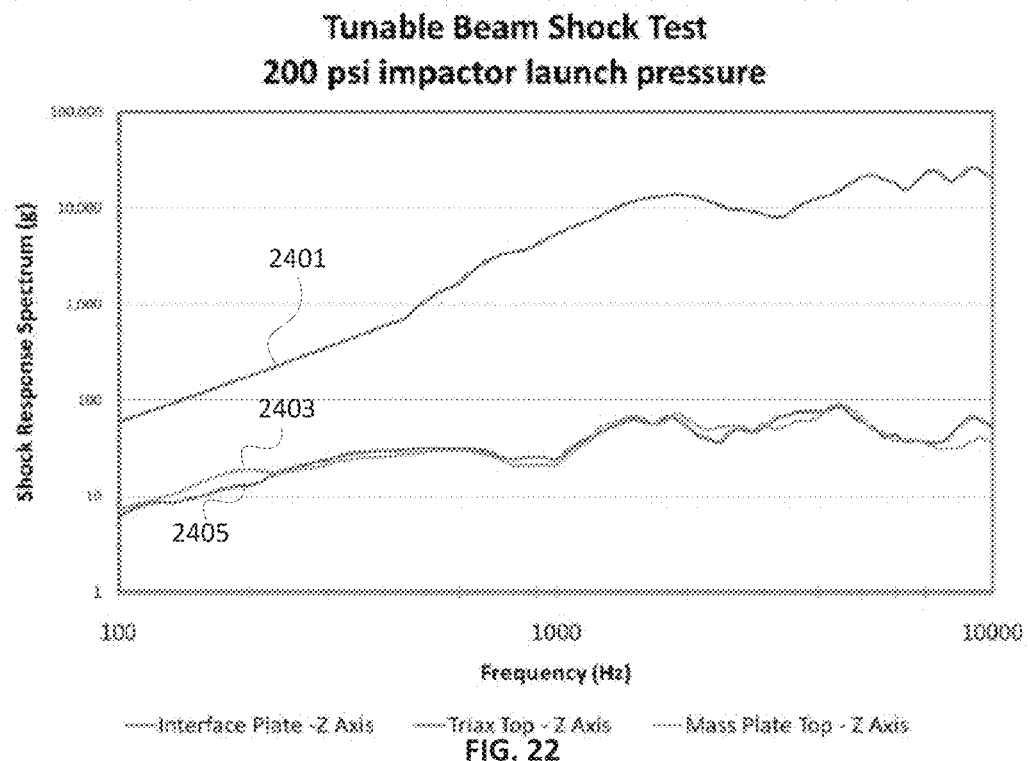
FIG. 22 is a graph of the shock response spectra for measured input and output accelerations on JPL's ETL tunable beam, tested at 1.379 MPa impactor launch pressure.
Figure 23:
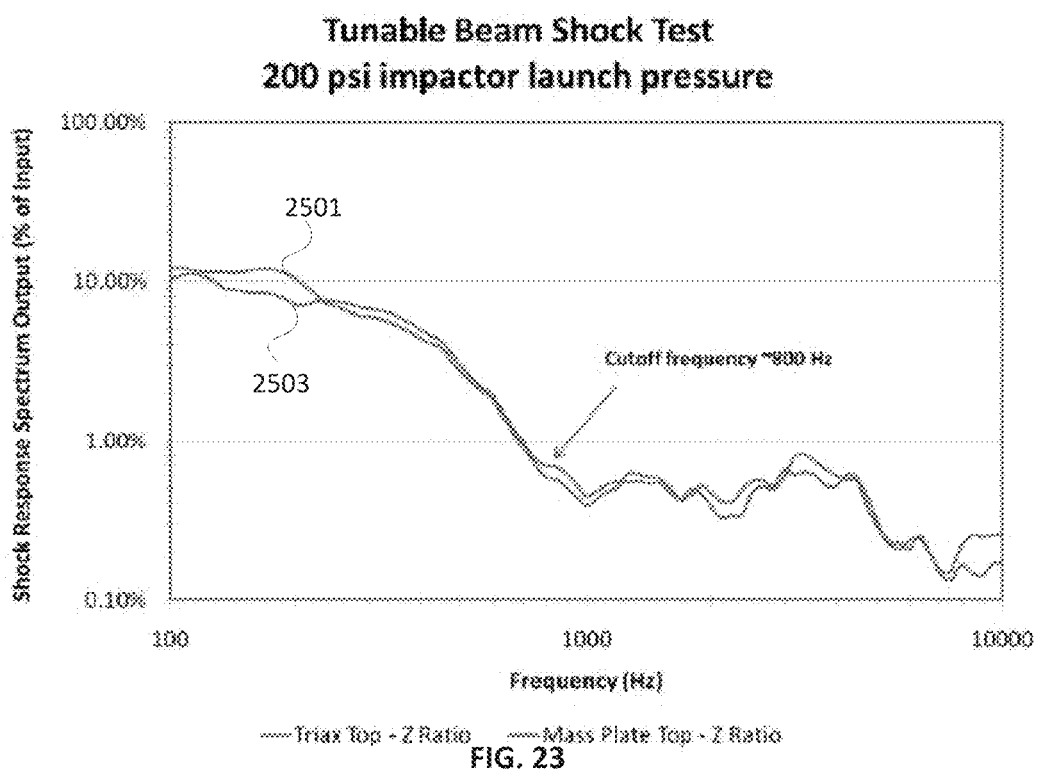
FIG. 23 is a graph of the ratio of output over input shock response spectra, for the JPL ETL tunable beam 1.379 MPa impactor launch pressure test.

Shocks of progressively increasing amplitude were applied by increasing the impactor launch pressure from 0.345 MPa to 1.379 MPa, with an array of static loadings. This test used a set of 6 Belleville springs per side, resulting in a collective casing coupling stiffness of 728 kN/m. FIGS. 21A-21D show the input and output axial (Z) accelerations for a 1.379 MPa test with a static compression of 480 N monitored by the embedded static load cell. In FIG. 21A, the trace 2301 shows the input accelerations at the north side of the base plate. In FIG. 21B, the trace 2302 shows the input accelerations at the south side of the base plate. In FIG. 21C, the trace 2303 shows the output accelerations at a triaxial accelerometer mounted on top of the piston. In FIG. 21D, the trace 2304 shows the output accelerations at an accelerometer mounted on the payload plate. FIG. 22 shows the SRS of those accelerations. In FIG. 22, the line 2401 shows the interface plate Z axis SRS, the line 2403 shows the mass plate top Z axis SRS, and the line 2405 shows the triaxial accelerometer Z axis SRS. The cutoff frequency appears to occur at approximately 800 Hz, as shown by the ratio of the input to output SRS acceleration responses shown in FIG. 23. In FIG. 23, the line 2501 shows the input to output SRS ratio for mass plate and the line 2503 shows the input to output ratio for the triaxial accelerometer. Shock attenuation by one order of magnitude was expected as a result of the dispersive effects of the granular chain. Additional damping was observed, contributed synergistically, and potentially caused by the structural mass of the prototype and dissipative effects as evidenced by the approximately 90%, or single order of magnitude, attenuation at frequencies in the pass band.

Figure 24:
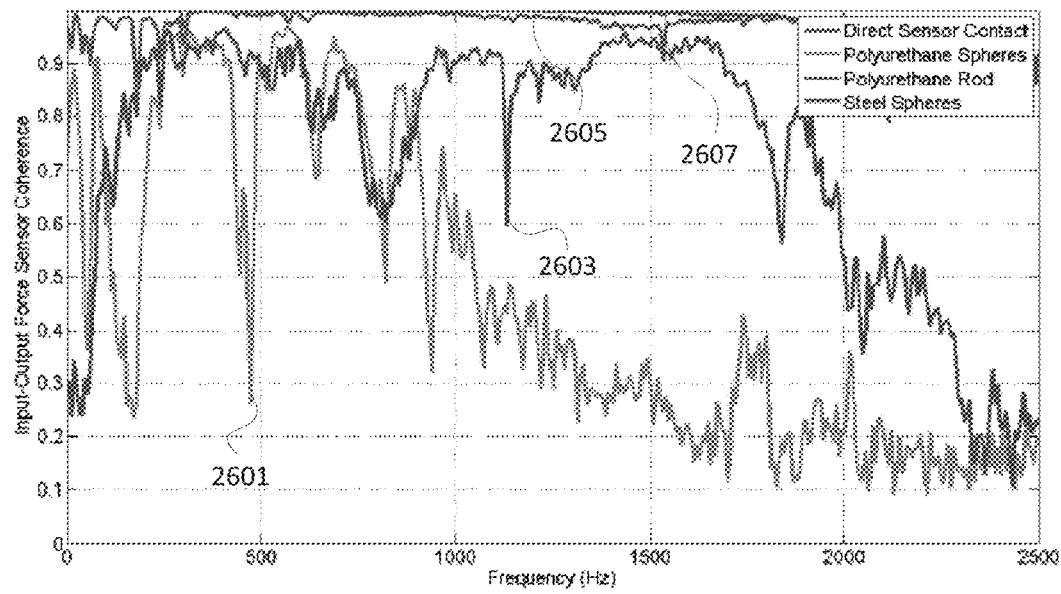
FIG. 24 is a graph comparing input to output force coherence for the low amplitude continuous broadband noise test at performed at the Caltech laboratory.

In order to independently confirm the results from the JPL ETL tunable beam, testing was conducted in the Caltech GALCIT laboratories. One end of the assembled prototype was attached to a steel mounting block. The casing of the prototype was positioned horizontally on insulating foam on an optical table. The front end cap assembly of the prototype was removed and low amplitude broadband noise was applied by an electrodynamic shaker directly to the first particle in the polyurethane monoatomic granular chain. Output dynamic force was measured using a dynamic force sensor mounted between the steel block and the attachment piston. Input dynamic force was measured with a dynamic force sensor mounted on the front of the shaker stinger in contact with the first sphere in the polyurethane monomer granular chain (or other material being tested). For the Caltech testing, static precompression was applied directly by the shaker internal spring, and measured by a load cell placed in line with the shaker stinger. This gave more direct input to the system of the low amplitude broadband noise Several material configurations were tested within the prototype test setup as described above. As shown in FIG. 24 the output to input dynamic force coherence for tests with direct input and output sensor contact, 0.0508 m steel spheres, 0.0508 m polyurethane spheres, and a 0.0508 m diameter, 0.559 m long continuous polyurethane rod made from the same material as the spheres are compared. In FIG. 24, the trace 2601 shows the force coherence for the polyurethane spheres, the trace 2603 shows the force coherence for the steel spheres, the trace 2605 shows the force coherence for the polyurethane rod, and the trace 2607 shows the force coherence for direct contact. The direct contact and the continuous polyurethane rod both have a constant coherence of approximately 1 throughout the test frequency region of interest. The 0.0508 m steel spheres exhibit a drop in coherence close to the estimated cutoff frequency of approximately 2 kHz. The 0.0508 m polyurethane spheres exhibit a significant drop in coherence around 800 Hz. Both the steel and polyurethane spheres show peaks and valleys throughout the pass band region, before the cutoff, as would be expected by the pattern of resonances in a discrete mass spring system.

Figure 25:
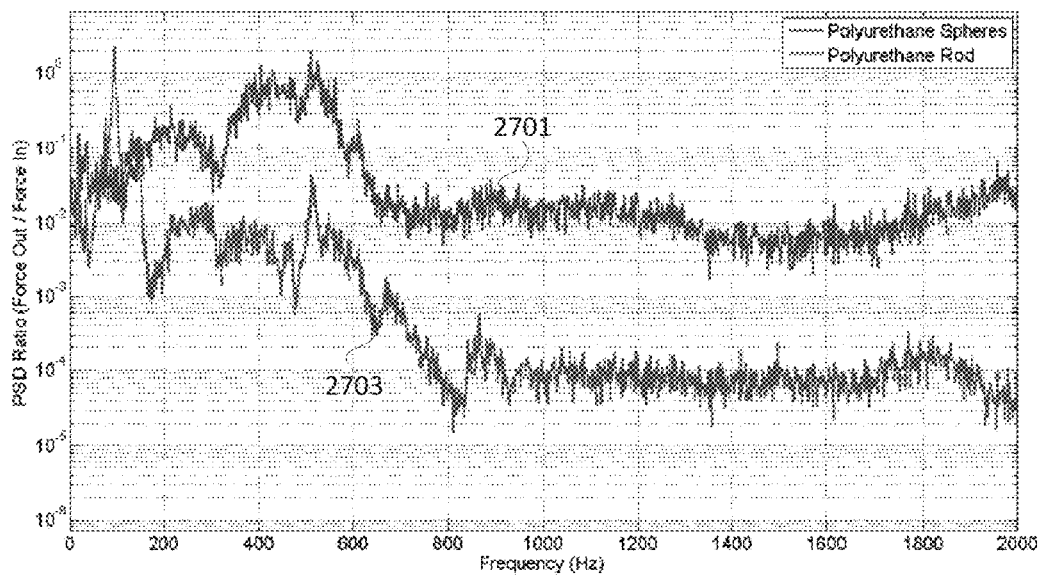
FIG. 25 is a graph comparing the ratio of Power Spectral Density of output over input force for a polyurethane rod versus a polyurethane sphere chain.

Furthermore, the material damping contribution is confirmed by Power Spectral Density (PSD) comparison between the output dynamic forces in the polyurethane spheres and solid polyurethane rod shaker tests as shown in FIG. 25. In FIG. 25, the trace 2701 shows the PSD for polyurethane rod and the trace 2703 shows the PSD for the polyurethane spheres. For the solid polyurethane rod, attenuation is approximately 2 orders of magnitude in PSD which equates to approximately 1 order of magnitude in the shock response spectrum. The polyurethane spheres similarly exhibit approximately 4 orders of magnitude in PSD attenuation, corresponding to the 2 orders of magnitude observed in the SRS for the tunable beam tests at JPL's ETL previously described.

Many of the materials and dimensions selected for the prototype described herein were for a developmental test scenario. Other devices may have the sizes and dimension reduced from those described herein. Still other devices may use sizes, dimension, and/or materials optimized for the most appropriate weight, strength and other relevant properties for the application scenario. Different material sizes, static compression, and periodicity from the prototype may be used to achieve different band structures while using design disclosed herein. Also, in operational scenarios with high dynamic loadings, many of the disclosed vibration suppressors could be used in parallel, while maintaining the same frequency response and transfer function characteristics, providing reduced peak loads and potentially also reducing system size.

The invention disclosed herein addresses uses in aerospace applications in multiple operational scenarios. However, other embodiments according to this invention may be used in other applications, in particular, in applications where one part of a system must be isolated from another part of a system causing vibration or transient shock events. Those skilled in the art understand that embodiments according to the disclosed invention may find application, for example, in the automotive and defense industries, as a new type of shock absorber and/or armor for vehicles and structures.

Disclosed herein is the design, development, fabrication, and testing of a prototype shock and vibration protection system that leverages dispersive acoustic band gaps. A cutoff frequency of kHz was demonstrated with significantly more than 99% attenuation past the cutoff. The prototype reveals a synergistic band gap/damping effect when packaging granular chains for shock and vibration protection in the method demonstrated. The prototype is configured as to be deployable in a hexapod configuration for system or payload protection.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art.

It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A vibration suppressor for suppressing vibrations between a payload and a vibration source, wherein the vibration suppressor comprises:
   a holder comprising a cylinder containing a continuous chain of granular particles,
   wherein the chain has a first chain particle located at a first end of the chain and a last chain particle located at another end of the chain, and
   wherein the granular particles comprise elastic spheres and the cylinder has a diameter larger than a dilated diameter of each sphere under static compression;
   a first piston having a first piston proximal end and a first piston distal end, wherein the first piston proximal end contacts the first chain particle and wherein the first piston distal end is configured to couple to the payload; and
   a second piston having a second piston proximal end and a second piston distal end, wherein the second piston proximal end contacts the last chain particle and wherein the second piston distal end is configured to couple to the vibration source, and
   wherein the first piston and second piston are movable longitudinally along the holder in order to apply and adjust the static compression to the continuous chain of granular particles, and
   wherein a particle radius and material type of the granular particles and the static compression are based on a cutoff frequency for vibration suppression.

2. The vibration suppressor according to claim 1, wherein the cylinder has a first cylinder end located proximate the first chain particle and a second cylinder end located proximate the last chain particle.

3. The vibration suppressor according to claim 2, further comprising
   a first end cap engaging the first cylinder end, wherein a portion of the first piston extends through the first end cap and the first piston distal end is located outside of the cylinder, and
   a second end cap engaging the second cylinder end, wherein a portion of the second piston extends through the second end cap and the second piston distal end is located outside of the cylinder.

4. The vibration suppressor according to claim 3, further comprising one of the following three spring configurations:
   a first spring configuration comprising a first piston spring located between the first end cap and the first piston proximal end and a second piston spring located between the second end cap and the second piston proximal end;
   a second spring configuration comprising a first piston spring located between the first end cap and the first piston proximal end; and
   a third spring configuration comprising a second piston spring located between the second end cap and the second piston proximal end,
      wherein compression of the spring configuration alters a longitudinal position of at least one of the first piston and the second piston to adjust the static compression.

5. The vibration suppressor according to claim 4, wherein the compression of the spring configuration is achieved by one of the following three end cap configurations:
- a first end cap configuration, wherein the first end cap has threads and the first cylinder end has complementary threads and the first end cap adjustably threads onto the first cylinder end to adjust the static compression applied to the chain of granular particles;
- a second end cap configuration, wherein the second end cap has threads and the second cylinder end has complementary threads and the second end cap adjustably threads onto the second cylinder end to adjust the static compression applied to the chain of granular particles; and,
- a third end cap configuration, wherein the first end cap has threads and the first cylinder end has threads complementary to the first end cap threads and the first end cap adjustably threads onto the first cylinder end to adjust the static compression applied to the chain of granular particles and wherein the second end cap has threads and the second cylinder end has threads complementary to the second end cap threads and the second end cap adjustably threads onto the second cylinder end to adjust the static compression applied to the chain of granular particles.

6. The vibration suppressor according to claim 1, wherein the elastic spheres comprise polyurethane spheres.

7. The vibration suppressor according to claim 1, wherein the cylinder comprises one or more vent holes extending through a wall of the cylinder from a cylinder exterior to a cylinder interior.

8. A vibration suppression system comprising:
a supporting base;
a payload attachment structure;
a plurality of vibration suppressors coupling the supporting base to the payload attachment structure, wherein at least one of the vibration suppressors comprises a tunable vibration suppressor comprising:
a holder comprising a cylinder containing a continuous chain of granular particles,
wherein the chain has a first chain particle located at a first end of the chain and a last chain particle located at another end of the chain, and
wherein the granular particles comprise elastic spheres and the cylinder has a diameter larger than a dilated diameter of each sphere under static compression;
a first piston having a first piston proximal end and a first piston distal end, wherein the first piston proximal end contacts the first chain particle and wherein the first piston distal end is configured to couple to the payload attachment structure; and
a second piston having a second piston proximal end and a second piston distal end, wherein the second piston proximal end contacts the last chain particle and wherein the second piston distal end is configured to couple to the supporting base, and
wherein the first piston and second piston are movable longitudinally along the holder in order to apply and adjust the static compression to the continuous chain of granular particles, and
wherein a particle radius and material type of the granular particles and the static compression are based on a cutoff frequency for vibration suppression.

9. The vibration suppression system according to claim 8, wherein the plurality of vibration suppressors comprises a total of three pairs of tunable vibration suppressors and wherein each pair of tunable vibration suppressors comprises two tunable vibration suppressors that are positioned non-parallel with each other.

10. The vibration suppression system according to claim 9, wherein the first piston distal end of a first tunable vibration suppressor of a first pair of tunable vibration suppressors couples to the payload attachment structure proximate to the first piston distal end of a second tunable vibration suppressor of the first pair of tunable vibration suppressors and wherein the second piston distal end of the first tunable vibration suppressor of the first pair of tunable vibration suppressors couples to the supporting base proximate to the second piston distal end of a tunable vibration suppressor of a second pair of vibration suppressors and wherein the second piston distal end of the second tunable vibration suppressor of the first pair of tunable vibration suppressors couples to the supporting base proximate to the second piston distal end of a tunable vibration suppressor of a third pair of vibration suppressors.

11. The vibration suppression system according to claim 10, further comprising one or more ball joints wherein at least one ball joint couples one of the piston distal ends of the tunable vibration suppressors to the supporting base or spacecraft attachment structure.

12. The vibration suppression system according to claim 8, wherein the supporting base or the payload attachment structure has a ring shape.

13. The vibration suppressor of claim 1, wherein the vibration suppression comprises dispersive suppression.

14. The system of claim 8, wherein the vibration suppression comprises dispersive suppression.

* * * * *